April 2, 1963   B. E. BALTHAZOR   3,083,502
BATTERY CARRIER AND LAMP ARRANGEMENT FOR TOYS
Filed Feb. 6, 1961

*INVENTOR.*
B. E. BALTHAZOR

BY

ATTORNEY

United States Patent Office 3,083,502
Patented Apr. 2, 1963

3,083,502
BATTERY CARRIER AND LAMP ARRANGEMENT FOR TOYS
Bernard E. Balthazor, Moline, Ill., assignor, by mesne assignments, to Buddy L Corporation, East Moline, Ill., a corporation of Delaware
Filed Feb. 6, 1961, Ser. No. 87,374
10 Claims. (Cl. 46—230)

This invention relates to a battery casing or carrier and lamp arrangement for toys and more particularly to such arrangement for use in toy vehicles that represent simulations or scale-models of full-size vehicles.

The principal object of the invention is to provide an improved casing or carrier for battery means of the dry cell type in association with a lamp which is exposed externally of a structural part of the toy. It is a further object of the invention to arrange the casing so that it is carried internally of the toy. A significant object resides in the provision of a two-piece casing adapted to contain one or more batteries of the dry cell type, arranged coaxially therein in end-to-end relationship, with terminal portions of the battery making electrical contact with other components which may also include the provision of an on-off switch. Other objects exist in connection with the mounting of the casing in the toy, a removable mounting for the casing, and such other features and advantages as will appear to those versed in the art as a preferred embodiment of the invention is disclosed in detail in the ensuing description and accompanying sheet of drawings, the figures of which are described below.

Figure 1:
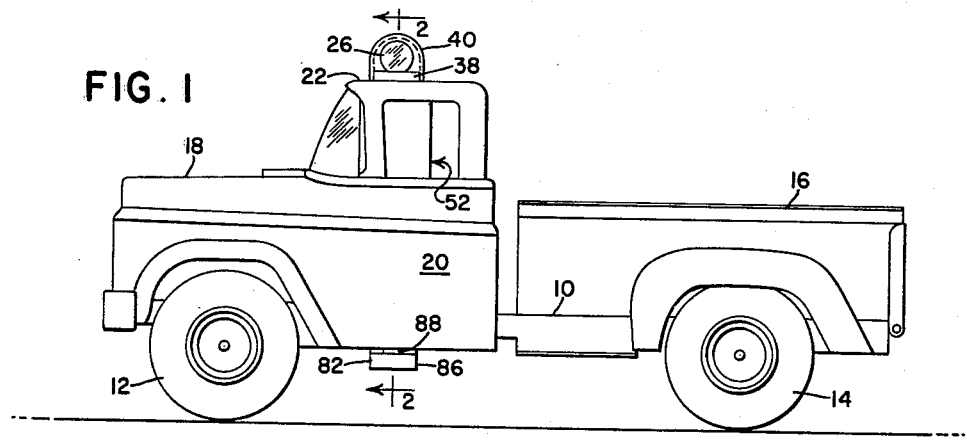
FIGURE 1 is an elevation of a representative toy vehicle embodying the invention.
Figure 2:
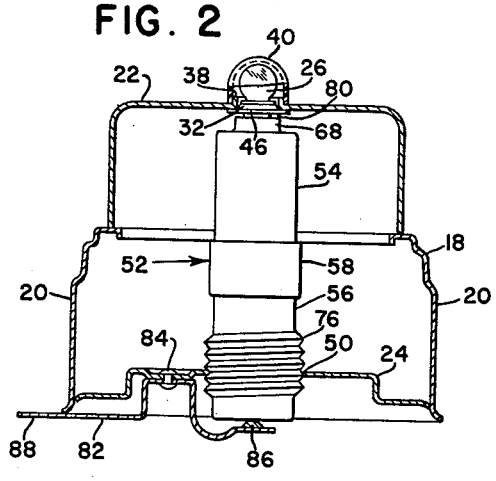
FIGURE 2 is a section on the line 2—2 of FIGURE 1, with the battery casing shown in elevation.

The toy pick-up truck illustrated in FIGURE 1 and chosen as the environmental structure for the invention has a longitudinal body 10 carried on front and rear wheels 12 and 14 respectively and including a rear cargo box 16 and a forward cab-hood-fender unit 18. This unit includes opposite side walls 20, a cab top or roof 22 and a floor 24. In the preferred embodiment disclosed here, the front unit structure 18 is of sheet metal, as are the roof 22 and floor 24. These components are rigidly interconnected in any suitable manner, as by spot welding or the like, which is immaterial, the point being that the parts being metal and being rigidly connected or otherwise associated provide electrical conducting means for completing an electrical circuit between a lamp 26 and battery means preferably comprising upper and lower or first and second dry cell batteries 28 and 30.

For the purpose of mounting the lamp 26, the roof 22 has therein an aperture 32 which is bordered by an upstanding annular flange 38 through which the lamp 26 projects or is exposed upwardly. A dome 40, which may be of relatively rigid transparent plastic material has a relatively tight slip fit with the annular flange 38 and normally encloses the lamp or bulb 26. This dome may be of any suitable color and the lamp may be of the flashing type to simulate the structure and function of an emergency vehicle, for example. These, however, do not constitute limitations on the applicability of the invention. The lamp has its base 42 threaded in typical fashion for threaded mounting in a metallic socket 44 which is part of a metallic lamp mount 46, and this mount is in turn secured to the roof 22, preferably at the under side thereof in any suitable manner such as to establish electrical contact. Riveting or spot welding may be employed to interconnect the mount 46 with the roof 22.

The socket 44 is of course open both upwardly and downwardly and the base 42 projects through the socket so that the lamp terminal 48 is interiorly of the cab unit 18. The floor 24 has therein an aperture 50 which is vertically coaxial with the roof aperture 32, and this aperture serves as means for mounting therein a cylindrical casing, designated in its entirety by the numeral 52, in which the batteries 28 and 30 are housed.

Figure 3:
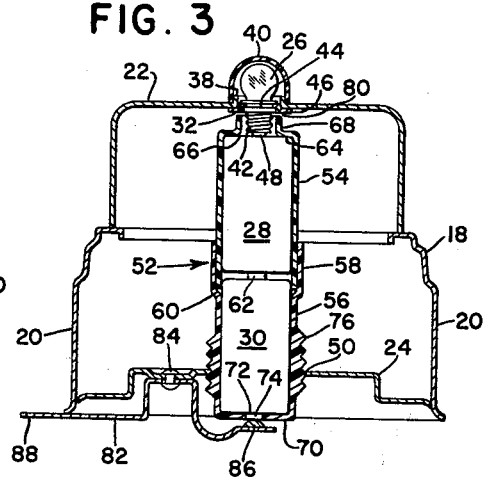
FIGURE 3 is a similar section with the battery casing shown in section.
Figure 4:
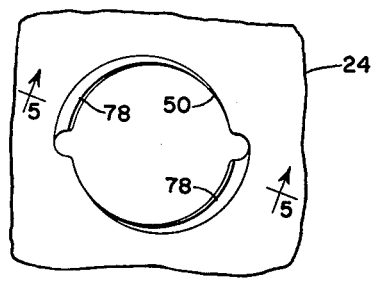
FIGURE 4 is an enlarged fragmentary view of the wall or comparable element of the vehicle in which the battery casing is carried.
Figure 5:
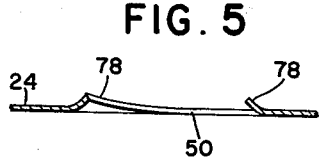
FIGURE 5 is a section on the line 5—5 of FIGURE 4.

This casing is of two-part construction and both parts are formed of non-electrical-conducting material, which may be any of the suitable well known plastics. The two parts represent upper and lower or first and second cup-like parts 54 and 56, respectively, and these parts telescopically interfit in an area intermediate the lamp terminal 48 and the floor 24 when the casing and batteries 28 and 30 are assembled and in place. As best seen in FIGURE 3, the lower casing part 56 is slightly enlarged at 58 to provide a shouldered recess 60 for receiving the lower end of the upper casing part 54, and it will be further seen that the combined length of the two casing parts when assembled is adequate to accommodate the two batteries 28 and 30 in end-to-end relationship, with the upper battery lower terminal 62 in electrical contact with the upper end of the casing of the lower battery 30 which of course represents the upper terminal of this lower battery. It will be further seen from FIGURE 3 that the upper casing part 54 has its radial end wall 64 uppermost and this wall is apertured at 66 and the aperture is bordered by an upstanding annular flange or collar 68 for accommodating the base of the hub or lamp 26, which collar loosely encircles the base. The relationship is such that the terminal 48 of the lamp engages the upper terminal of the upper battery as represented by the upper end of the casing of the battery 28. The lower casing part 56 has its lower radial end wall 70 provided with an aperture 72 which accommodates the lower or end terminal 74 of the lower battery 30. Thus, although the two batteries are completely assembled and substantially enclosed within the casing 52, opposite terminal portions thereof are exposed to the terminal 48 of the lamp 26 and to other electrical means to be presently described.

Means is provided for removably mounting the assembled casing 52 in place, and this means preferably takes the form of external threads 76 formed on the lower casing part 56 and threadedly cooperating with internal thread means formed in the floor 24 by diametrically opposed portions 78 of the floor bordering the aperture 50 which are displaced away from the plane of the floor. Thus, the entire assembly may be threaded into and out of normal position, it being understood, of course, that is the preferred construction illustrated, the lamp 26 remains in place. If it becomes necessary to replace the lamp, the dome 40 may be slipped off the annular flange or collar 38 and the lamp unscrewed from its socket 44. A slight space exists at 80 between the upper terminal end of the casing flange or collar 68 and the lamp mount 46 so that the assembled casing may be relatively tightly screwed into place to establish proper electrical contact between the lamp terminal 48 and the proximate end of the upper battery 28.

For the purpose of completing the electrical circuit, the floor 24 may carry thereon an on-off switch 82, pivoted to the floor as at 84 and having an inner end 86 capable of making electrical contact with the lower battery lower terminal 74. The switch may include a lever portion 88, available at one side of the vehicle, for example, for the purpose of manually pivoting the switch so that the portion 86 thereof is movable into and out of contact with the terminal 74 of the battery 30. The pivotal mounting of the switch is of course such that the end 86 thereof may be swung clear of the casing 52 when it is desired to remove and install the casing.

The casing is relatively inexpensive to manufacture and may be formed by any of the known plastic-forming methods. It is light in weight, easy to handle and the threaded portion 76 may be integrally formed therein during the forming process. Being of non-electrical-conducting material, it eliminates short circuits and otherwise is electrically as well as structurally acceptable.

Features and advantages other than those categorically enumerated will readily occur to those versed in the art, as will many modifications and alterations in the preferred embodiment disclosed, all of which may be achieved without departing from the spirit and scope of the invention.

What is claimed is:

1. In a toy vehicle: a body including a roof and a floor respectively having apertures therein alined on a vertical axis; a lamp mount in register with the roof aperture and engaging and carried by the roof adjacent to said roof aperture, said mount including a lamp socket opening both upwardly and downwardly; an electric lamp exposed through the roof aperture and having a base carried in the socket, said lamp including a terminal projecting downwardly through the socket; a two-part casing cylindrical on a vertical axis and extending from the lamp terminal and through the floor aperture, said casing including upper and lower cup-like parts telescopically interfitting in an area between the lamp and the floor, said upper part having an upper radial end wall provided with an opening through which the lamp terminal projects loosely into the interior of the casing and said lower part having a lower radial end wall below the level of the floor and having a central opening; upper and lower dry cell batteries coaxially carried in the casing in end-to-end contact, with the upper battery upper terminal in contact with the lamp terminal and the lower battery lower terminal exposed through the lower casing part opening; means separably cooperative between the lower casing part and the floor for normally holding the casing parts together with the batteries in axial compression between the radial end wall of the lower casing part and the lamp terminal and enabling downward removal of the casing parts and batteries away from the lamp; and means electrically interconnecting the lamp base and the lower battery lower terminal via said lower casing part opening.

2. The invention defined in claim 1, in which: a portion of the lamp base projects downwardly through the lamp mount into proximity to the upper casing radial end wall, and the upper casing part has on its upper radial end wall a collar coaxial with said upper part opening and projecting upwardly in encircling relation to said lamp base portion.

3. The invention defined in claim 1, in which: said separably cooperative means comprises external threads on the lower casing part and matching internal thread means about the floor aperture.

4. The invention defined in claim 3, in which: the floor in the area of said floor aperture is of sheet-like material having portions thereof displaced from the plane of the floor to provide said internal thread means.

5. In a toy vehicle; a metallic body including a roof and a floor respectively having apertures therein alined on a vertical axis; a metallic lamp mount in register with the roof aperture and engaging and carried by the roof adjacent to said roof aperture, said mount including a lamp socket opening both upwardly and downwardly; an electric lamp exposed through the roof aperture and having a base carried in the socket, said lamp including a terminal projecting downwardly through the socket; a two-part casing of non-electrical conducting material, cylindrical on a vertical axis and extending from the lamp terminal and through the floor aperture, said casing including upper and lower cup-like parts telescopically interfitting in an area between the lamp and the floor, said upper part having an upper radial end wall provided with an opening through which the lamp terminal projects loosely into the interior of the casing and said lower part having a lower radial end wall below the level of the floor and having a central opening; upper and lower dry cell batteries coaxially carried in the casing in end-to-end contact, with the upper battery upper terminal in contact with the lamp terminal and the lower battery lower terminal exposed through the lower casing part opening; means separably cooperative between the lower casing part and the floor for normally holding the casing parts together with the batteries in axial compression between the radial end wall of the lower casing part and the lamp terminal and enabling downward removal of at least the lower casing part to permit removal of the batteries; and means electrically interconnecting the body and the lower battery lower terminal via said lower casing part opening.

6. In a toy vehicle: a metallic body including a roof and a floor respectively having apertures therein alined on a vertical axis; a metallic lamp mount in register with the roof aperture and engaging and carried by the roof adjacent to said roof aperture, said mount including a lamp socket opening both upwardly and downwardly; an electric lamp exposed through the roof aperture and having a base carried in the socket, said lamp including a terminal projecting downwardly through the socket; a two-part casing of non-electrical conducting material, cylindrical on a vertical axis and extending from the lamp terminal and through the floor aperture, said casing including upper and lower cup-like parts telescopically interfitting in an area between the lamp and the floor, said upper part having an upper radial end wall provided with an opening through which the lamp terminal projects loosely into the interior of the casing and said lower part having a lower radial end wall below the level of the floor and having a central opening; dry cell battery means carried in the casing, with the upper battery means terminal in contact with the lamp terminal via said upper end wall opening and the battery means lower terminal exposed through the lower casing part opening; means separably cooperative between the lower casing part and the floor for normally holding the casing parts together with the battery means in axial compression between the radial end wall of the lower casing part and the lamp terminal; and means electrically interconnecting the body and the lower battery means terminal via said lower casing part opening.

7. In a toy: base structure including first and second spaced apart wall-like elements respectively having first and second through apertures therein alined on a common axis; a lamp mount engaging and carried by the first wall and including a socket in register with the first aperture and opening to both sides of the first element; a lamp exposed outwardly through the first aperture and having a base carried in said socket, said lamp including a terminal projecting inwardly through the socket and toward the second element; a two-part casing cylindrical on said axis and extending from the lamp terminal and through the second aperture, said casing including first and second parts telescopically interfitting in an area between said elements, said first part having a radial end wall proximate to the lamp terminal and apertured to receive said terminal and said second part having an apertured radial end wall beyond the second element; first and second dry cell batteries coaxially carried in the casing in end-to-end contact, with the end terminal of the first battery in contact with the lamp terminal and the opposite end terminal of the second battery exposed through the second casing part opening; means separably cooperative between the second casing part and the second element for normally holding the casing parts together with the batteries in axial compression between the radial end wall of the second casing part and the lamp terminal and enabling coaxial withdrawal of the casing and batteries as a unit away from the lamp; and means electrically interconnecting the lamp base and the second battery end terminal via said second casing part opening.

8. In a toy: base structure including first and second spaced apart wall-like elements respectively having first and second through apertures therein alined on a common axis; a lamp mount engaging and carried by the first wall within said first aperture and including a socket projecting into the interior of said structure and remotely spaced from the second element; a lamp carried by the mount and exposed through said first aperture to the exterior of the structure and having a base terminal within the structure and remotely spaced from said second element; a battery and casing unit disposed coaxially with the second aperture and supported by the second element, said unit including a two-part cylindrical casing containing battery means and telescopically assembled with the battery means therein, one end of said casing having an opening therein for contact with the lamp terminal; and means removably connecting the second element and casing, including cooperative portions on said second element and on that casing part proximate to said casing element, said means normally retaining the unit in assembled relation with the battery means in contact with the lamp terminal as aforesaid but enabling removal of said unit away from the lamp via said second aperture and exteriorly of said structure.

9. The invention defined in claim 8 in which said cooperative portions comprise interengaging screw threads respectively on said casing part and on said second element about the second aperture.

10. The invention defined in claim 9, in which the area of said second element around said second aperture is of sheet-like form having portions displaced from the plane of said area to provide one of said screw thread portions.

References Cited in the file of this patent
UNITED STATES PATENTS

| | | |
|---|---|---|
| 2,451,801 | Buchmann | Oct. 19, 1948 |
| 2,698,495 | Ciampa | Jan. 4, 1955 |

FOREIGN PATENTS

| | | |
|---|---|---|
| 1,051,704 | Germany | Feb. 26, 1959 |